C. F. STANDISH.
FRUIT JAR OPENER.
APPLICATION FILED APR. 12, 1920.
1,359,629.
Patented Nov. 23, 1920.
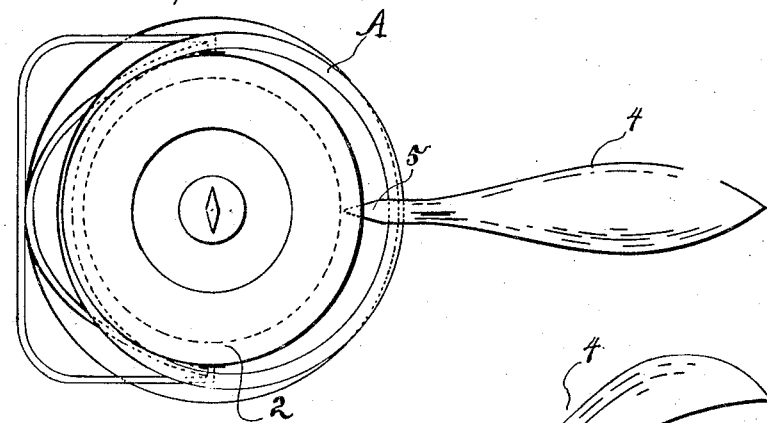
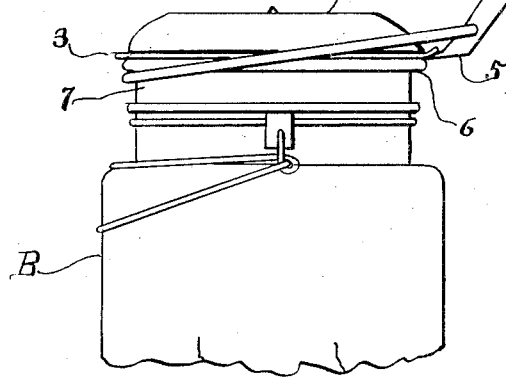
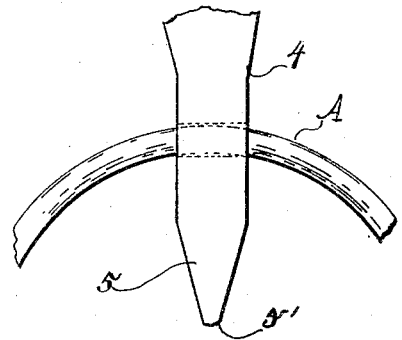
INVENTOR
Charles F. Standish
BY
F. N. Gellert
ATTORNEY

UNITED STATES PATENT OFFICE.

CHARLES F. STANDISH, OF GREENE, NEW YORK.

FRUIT-JAR OPENER.

1,359,629.

Specification of Letters Patent. Patented Nov. 23, 1920.

Application filed April 12, 1920. Serial No. 373,428.

*To all whom it may concern:*

Be it known that I, CHARLES F. STANDISH, a citizen of the United States, residing at Greene, in the county of Chenango and State of New York, have invented certain new and useful Improvements in Fruit-Jar Openers, of which the following is a specification.

My invention relates to an improvement in fruit jar openers in which the lid of the jar is unloosened by leverage pressure applied to a metal point inserted at the outer edge of the top, and it has for its object to provide a device of the class described, simple and serviceable in construction and inexpensive to manufacture, which can be easily arranged about the top of the fruit jar or other receptacle which has means whereby the cover of the jar can be easily removed without breaking or injury to the same or the rubber washer on which the cap rests. With these objects in view my invention consists of certain novel features of construction and arrangements of parts as are hereinafter more clearly described and pointed out in the claims reference being had to the accompanying drawings, in which—

Figure 1, is a plan view of my device showing the opener in an operative position.

Fig. 2. is an elevation view showing an embodiment of my invention arranged about the top of the jar.

Fig. 3. is a plan view of a fragmentary part of my device. The same reference characters denote like parts in each of the several figures of the drawing.

The jar opener I provide is especially adapted for removing covers of glass fruit jars, or light receptacles. In the specific form of my device, I provide a collar A formed of any suitable metal, which is adapted to be arranged about the top of a jar or other receptacle. B designates an ordinary lightning jar, having the usual cap 2 and gasket, or ring 3 on which the cap rests.

My invention embodies a handle 4, which has projecting an opening point 5 adapted to be inserted between the ring or gasket 3 and flange or rim 6 surmounting the neck of the jar B, while the collar A acts as the neck of the jar B, the collar A acts as a holding device, and is adapted to embrace the jar and hold the opening point in position to operate; a handle which by its convenient movement in conjunction with the holder allows it to be adjusted laterally from point to point around the jar, at the same time by leverage to force the point beneath the cap sufficiently to admit air to break the vacuum; the encircling collar A is pivoted in handle 4 and may be conveniently made of wire although this is not essential to the construction; the holder when made of wire is presumably placed on neck 7 of jar B beneath flange 6 and as soon as the handle is turned the pressure on the wire A will tend to draw point 5 into the space between cap 2 and gasket 3 and raise cap.

In the use of my device the holder A being placed around neck 7, the point 5′ of the opener is inserted beneath the edge of gasket 3 and thereafter handle 4 is moved downward thus by leverage the opening point 5′ is forced between jar and gasket 3 and loosening the cap.

Having thus described my invention what I claim as new and for which I desire Letters Patent is as follows:

1. In a jar opener, a lifting element having an engaging projection at one end adapted for insertion under a jar cap, a yoke for embracing a jar neck, the said yoke and lifting element being pivotally connected together whereby the lifting element oscillates substantially in a plane passing through the longitudinal axis of the jar.

2. In a jar opener, a lifting element having an engaging projection at one end, a yoke for embracing a jar neck pivotally connected to the said lifting element near the end having the projection, and in such relation that the lifting element oscillates substantially in a plane passing through the longitudinal axis of the jar and advances to insert the projection under the jar cap when force is applied to the outer end of the lifting element.

In testimony whereof I have affixed my signature.

CHARLES F. STANDISH.